US012496611B2

(12) United States Patent
Stolt et al.

(10) Patent No.: US 12,496,611 B2
(45) Date of Patent: Dec. 16, 2025

(54) DISPENSER AND A CONTROL METHOD OF THE DISPENSER

(71) Applicant: Hilti Aktiengesellschaft, Schaan (LI)

(72) Inventors: Rocco Stolt, Niederraunau (DE); Michael Wiedemann, Koenigsbrunn (DE)

(73) Assignee: Hilti Aktiengesellschaft, Schaan (LI)

( * ) Notice: Subject to any disclaimer, the term of this patent is extended or adjusted under 35 U.S.C. 154(b) by 300 days.

(21) Appl. No.: 18/256,594

(22) PCT Filed: Nov. 16, 2021

(86) PCT No.: PCT/EP2021/081810
§ 371 (c)(1),
(2) Date: Jun. 8, 2023

(87) PCT Pub. No.: WO2022/122314
PCT Pub. Date: Jun. 16, 2022

(65) Prior Publication Data

US 2023/0364637 A1 Nov. 16, 2023

(30) Foreign Application Priority Data

Dec. 10, 2020 (EP) .................................... 20212980

(51) Int. Cl.
*B05C 17/01* (2006.01)
*B05C 11/10* (2006.01)

(52) U.S. Cl.
CPC ...... *B05C 17/0103* (2013.01); *B05C 11/1002* (2013.01)

(58) Field of Classification Search
CPC .. B05C 17/0103; B05C 11/1002; B05C 11/10
See application file for complete search history.

(56) References Cited

U.S. PATENT DOCUMENTS 5,672,155 A 9/1997 Riley et al.
6,216,822 B1 4/2001 May et al.
(Continued)

FOREIGN PATENT DOCUMENTS

DE 10 2016 213 882 A1 2/2018
WO 2013/104362 7/2013
WO WO-2013104362 A1 * 7/2013 ........... B05B 12/002

OTHER PUBLICATIONS

Office Action received for U.S. Appl. No. 18/256,344, mailed on Apr. 10, 2025, 8 pages.
(Continued)

*Primary Examiner* — Bob Zadeh
(74) *Attorney, Agent, or Firm* — Grüneberg and Myers PLLC

(57) ABSTRACT

A dispenser for compound-containing containers includes a receiving chamber for a container; at least one push rod displaceable relative to the receiving chamber; a motor for moving the at least one push rod; a control unit for controlling the motor; a main switch for activating the motor; an operation selection switch for switching between different operation modes; and a first sensor configured to detect a position or movement of the push rod. The operation selection switch is configured to select an amount of the compound to be dispensed in one application run. The dispenser will warn the user once the remaining amount of the compound in the container is less than the needed amount for next application, so that the user will notice the compound shortage and prepare an additional container before starting the next application. Accordingly, rework of cured chemical compounds will be avoided.

10 Claims, 3 Drawing Sheets

(56) References Cited

U.S. PATENT DOCUMENTS

| | | | |
|---|---|---|---|
| 6,854,349 B2 | 2/2005 | Brandhorst et al. | |
| 6,889,872 B2 | 5/2005 | Herman et al. | |
| 6,932,237 B2 | 8/2005 | Heymann et al. | |
| 7,116,071 B2 | 10/2006 | Glasgow et al. | |
| 8,387,825 B2 * | 3/2013 | Herman | B05C 17/0103 222/63 |
| 8,684,229 B2 | 4/2014 | Harre et al. | |
| 9,359,122 B2 | 6/2016 | Schmid et al. | |
| 9,452,443 B2 | 9/2016 | Grontved et al. | |
| 9,931,665 B2 | 4/2018 | Cheung et al. | |
| 10,265,721 B2 | 4/2019 | Beckett et al. | |
| 10,682,666 B2 | 6/2020 | Routen et al. | |
| 10,894,272 B2 | 1/2021 | Turner et al. | |
| 11,130,150 B2 | 9/2021 | Welch | |
| 11,458,503 B2 | 10/2022 | Kuhn et al. | |
| 11,465,170 B2 | 10/2022 | Turner et al. | |
| 11,673,160 B2 | 6/2023 | Kuhn et al. | |
| 2008/0073381 A1 * | 3/2008 | Wang | F16N 3/12 222/333 |
| 2009/0101673 A1 | 4/2009 | Alioto et al. | |
| 2011/0151042 A1 * | 6/2011 | Strobel-Schmidt | B29C 48/02 425/145 |
| 2013/0020350 A1 | 1/2013 | Gardos et al. | |
| 2015/0014351 A1 | 1/2015 | Grontved et al. | |
| 2015/0266050 A1 * | 9/2015 | Beckett | B05C 17/0103 222/310 |
| 2016/0169446 A1 * | 6/2016 | Peters | H04B 5/77 222/23 |
| 2016/0325391 A1 * | 11/2016 | Stampfl | B25B 21/00 |
| 2022/0000093 A1 * | 1/2022 | Ko | B05C 17/0103 |
| 2022/0339590 A1 | 10/2022 | Turner et al. | |
| 2023/0158541 A1 | 5/2023 | Schäuble et al. | |
| 2023/0364637 A1 * | 11/2023 | Stolt | B05C 11/1002 |
| 2024/0017287 A1 | 1/2024 | Stolt et al. | |

OTHER PUBLICATIONS

International Search Report issued Feb. 7, 2022, in PCT/EP2021/081810, 3 pages.
Written Opinion issued Feb. 7, 2022, in PCT/EP2021/081810, 5 pages.
Office Action received in U.S. Appl. No. 18/256,385 mailed on Mar. 10, 2025, 10 pages.
Stolt et al., U.S. Appl. No. 18/256,408, filed Jun. 7, 2023.
Stolt et al., U.S. Appl. No. 18/256,344, filed Jun. 7, 2023.
Wiedemann et al., U.S. Appl. No. 18/256,385, filed Jun. 7, 2023.
U.S. Appl. No. 18/256,408, filed Jun. 7, 2023, Stolt et al.
U.S. Appl. No. 18/256,344, filed Jun. 7, 2023, Stolt et al.
U.S. Appl. No. 18/256,385, filed Jun. 7, 2023, Wiedemann et al.

* cited by examiner

DISPENSER AND A CONTROL METHOD OF THE DISPENSER

CROSS-REFERENCE TO RELATED APPLICATIONS

This application is the National Stage entry under § 371 of International Application No. PCT/EP2021/081810, filed on Nov. 16, 2021, and which claims the benefit of priority to European Application No. 20212980.5, filed on Dec. 10, 2020. The content of each of these applications is hereby incorporated by reference in its entirety.

BACKGROUND OF THE INVENTION

Technical Field

The present invention relates to a dispenser for compound-containing containers. The present invention also relates to a control method for use in such a dispenser.

Description of Related Art

A dispenser is used for dispensing compounds which are packaged in containers, such as mortar and sealing compounds, at a site of application. The containers include, for example, hard cartridges having one or more receiving chambers for one or more components of the compound to be dispensed which are provided directly or packaged, e.g. in foil packs, in the receiving chambers of the cartridge. The term "container" further includes foil packs which are filled with one or more compounds to be dispensed and which are inserted in a separate receiving body or in a receiving body mounted on the dispenser.

It is known that the dispenser can work in serial applications in which it eases the repetition of dispensing the same amount of compound. Mainly in serial applications, customers face the problem, not to know, if the remaining amount of the compound in the container is enough to fulfill the next application. The user only can estimate the remaining amount of the compound by the position of the push rod. If the user runs into a shortage of material, the application couldn't be finished. If the user is not aware of the shortage of the compound in the container, he has to change a new container during the application process when the remaining amount of the compound is less than the amount of the compounds needed for a full application. Especially for fast cure chemical compound, the user has to fulfill the application in a defined time, the timing for changing a new container may cause a rework of cured chemical compound.

SUMMARY OF THE INVENTION

It is an object of the present invention to provide an operating method for a dispenser will be able to predict if the remaining amount of the compound in the container is enough to fulfill the application and provide a feedback to the user.

The method of the present invention for operating the dispenser includes the following steps: a). selecting an amount of the compound to be dispensed for one application run via an operation selection switch; b). triggering main switch to activate the motor and a first sensor detecting a position or movement of the push rod; c). a control unit calculating the remaining amount of the compound in the container and warning the user if the remaining amount is less than the selected amount of the compound.

Hereby, the operating method will help the user know if the remaining amount of the compound is enough to fulfill the application before he starts. With a warning signal feedback, the user is able to get additional material proactively, without interrupting the application.

Preferably, the operation selection switch comprises a serial position in which the one application run is repeated and the selected amount of the compound to be dispensed is the same in the repetition of the one application run. The user would not expect an interruption in one of the repeated applications runs during the serial applications because it may cause to rework of cured chemical compound. It is advantageous that if the user can notice the compound shortage between one full application run and the next one. Then the user changes a new container or provide the additional material to avoid a dissatisfied dispensing during the serial applications.

According to invention, a second sensor is configured to detect the selected amount of the compound according to the selected position of the operation selection switch. The operation selection switch is linked to a second sensor, which is monitored by the control unit, too. Then the control unit will compare the values of the remaining amount and the selected amounts and provides a feedback signal to the customer if the remaining amount in the container is less than the selected amount of the compound. Hereby, the user is able to prepare all needed compound or material beforehand and can ensure a minimum interruption of the dispensing process.

Preferably, the remaining amount in the container is calculated by detecting the position of the push rod. The push rods of the dispenser are linked to a first sensor, which is monitored by the control unit. The remain amount of compound is represented by the position of the push rod. Alternatively, the remaining amount in the container is calculated by summarizing the previous movements of the push rod. The control unit can calculate the previous movements of the push rod to a value of the remaining amount of the compound in the container.

The present invention provides a dispenser for compound-containing containers, comprising: a receiving chamber for a container; at least one push rod displaceable relative to the receiving chamber; a motor for moving the at least one push rod; a control unit for controlling the motor; a main switch for activating motor; an operation selection switch for switching between different operation modes, the operation selection switch being configured to select amount of the compound to be dispensed in one application run; a first sensor configured to detect a position or movement of the push rod, characterized in that the control unit is configured to calculate the remaining amount of the compound in the container and provide a signal if the remaining amount of the compound in the container is less than the selected amount of the compound to be dispensed. The dispenser according to the invention will warn the user once the remaining amount of the compound in the container is less than the needed amount for next application, then the user will notice the compound shortage and prepare an additional container before he starts next application. A rework of cured chemical compounds will be avoided.

In an advantageous configuration of the dispenser according to the invention it is provided that the operation selection switch comprises a serial position in which the one application run is repeated and the selected amount of the compound to be dispensed set by the operation se lection switch is same in the repetition of the one application run.

In another advantageous configuration of the dispenser according to the invention it is provided that a second sensor is configured to detect the selected amount of the compound set by the operation selection switch according to the current position of the operation selection switch. As the remaining amount of the compound in the container is a value calculated by summarizing the previously movements of the push rods, the control unit of the dispenser can calculate the left material in the container with the movements of the push rod detected by the first sensor. Also, with the second sensor detecting the selected position of the operation selection switch, the control unit will know the selected dosing amount set by the operation selection switch by the user at first. By comparing these two amounts, the dispenser will evaluate if the remaining amount of the compound is enough to fulfill the next application run.

In yet another advantageous configuration of the dispenser according to the invention it is provided that the dispenser comprises an indicator which is configured to reflect the warning signal. Preferably, the indicator is a LED light. Alternatively, the dispenser will inform the user in a second way, for example, an audible signal. With this action, the user will notice the compound shortage. The user is able to prepare all the needed material before he starts the application thereby ensuring a minimum interruption of the dispensing process.

BRIEF DESCRIPTION OF THE DRAWINGS

Further features and advantages of the invention are described in greater detail hereinafter by means of an embodiment by way of example with reference to the drawings. In the Figures.

DETAILED DESCRIPTION

Figure 1:
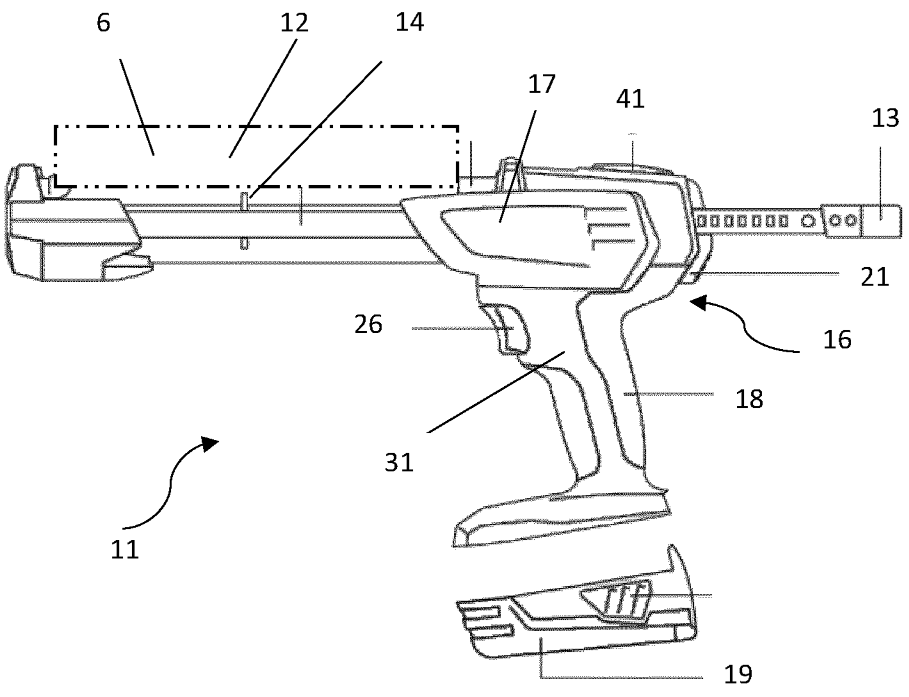
FIG. 1 is a top, front perspective view of an embodiment of a dispenser.

Dispenser 11 for compound-containing containers 6, as shown in FIG. 1, has a receiving chamber 12 for container 6, a push rod 13 which is displaceable relative to receiving chamber 12, and an electrically operable extrusion mechanism. A pressure piston 14 for applying pressure to container 6 and/or to the compound contained therein is provided on the end of push rod 13 facing receiving chamber 12. Operation of dispensing mechanism 16 causes push rod 13 to move into receiving chamber 12, thereby pressurizing the compound contained in container 6, causing it to be extruded through outlet of container 6. The compound contained in container 6 includes one or several components. According to a preferred embodiment of the invention, the compound contained in container 6 includes two compounds, thereby two push rods being displaceable relative to the receiving chamber 12. A mixer (not shown) is advantageously provided at outlet of the container 6, said mixer ensuring complete mixing of the components prior to being discharged through the outlet.

Dispensing mechanism 16 is accommodated in a housing 17 having a handle 18 extending therefrom. A power supply 19 in the form of a battery pack is detachably connected to the free end of handle 18. Dispensing mechanism 16 includes a motor 21 which, via a transmission mechanism, drives a drive wheel (not shown) meshing with teeth on push rod 13, thereby moving the push rod 13.

Handle 18 is further provided with a main switch 26 in the form of a push button for generating a control signal in response to actuation of main switch 26. Also provided is a control unit 31 for controlling motor 21, said control unit having a power module for connecting the motor 21 to power supply 19.

Figure 2:
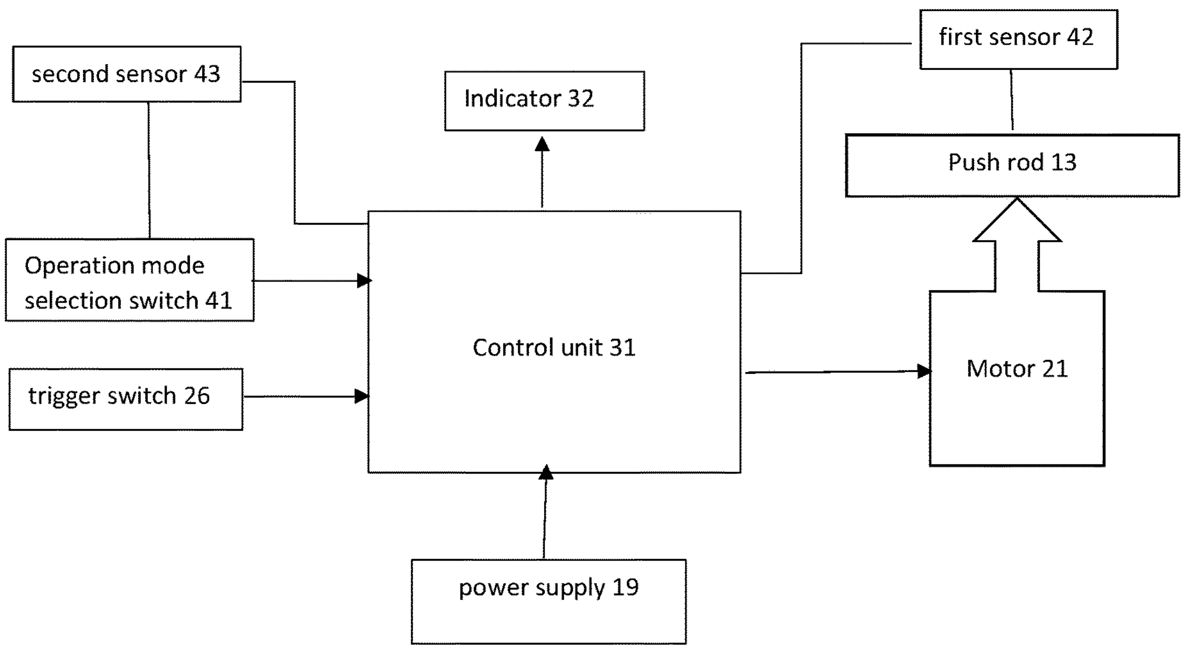
FIG. 2 is a schematic diagram of the dispenser of FIG. 1 including a control unit.

As shown schematically in FIG. 2, the main switch 26 is electrically connected to control unit 31. Furthermore, an operation selection switch 41 is provided for adjusting the amount of compound to be dispensed with each full run. This operation selection switch 41 is also electrically connected to control unit 31. Typically, the operation selection switch 41 is a dosing wheel. According to a preferred embodiment of the invention, Operation selection switch 41 includes a potentiometer and provides a plurality of possible settings for the dispensing of correspondingly defined amounts of the compound to be extruded, including a “zero” position, in which actuation of main switch 26 does not cause motor 21 to be connected to power supply 19, and a “continuous” position, in which motor 21 is connected to power supply 19 for as long as main switch 26 is actuated. Moreover, the operation selection switch 41 further includes a “serial” position, in which one application run is repeated and the selected amount of the compound to be dispensed is the same in the repetition of the application runs. Herein “application run” means one dosing process which is started by a user and terminated automatically once the preselected amount of the compound has been dispensed, e.g. when the push rod has been moved accordingly. When the operation selection switch is set in a serial position, the dispenser 11 performs a serial working mode, in which the one application run is repeated and the selected amount of the compound to be dispensed set by the operation selection switch 41 is same in the repetition of everyone application run.

The dispenser 11 comprises a first sensor 42 for detecting the movements of the at least one push rod. The first sensor 42 is electronically connected to the control unit 31. The dispensed amount of the compound is a value indicating the movements of the push rod. The first sensor 42 sends the signal of the previously movements of the push rod 13, therefore the control unit can calculate the remaining amount of the compound in the container with the data from the first sensor.

The dispenser comprises a second sensor 43, which is electronically connected to the control unit 31. The second sensor 43 is linked to the operation selection switch 41. When the user selects a defined amount of the compound to be dispensed in one applications run, the second sensor 43 sends a signal to the control unit 31 and then the control unit 31 will save the value of the selected amount of the compound to be dispensed. Alternatively, the operation selection switch can be electronically to the control unit directly. Once a defined amount of the compound to be dispensed is selected by the operation selection switch 41, the control unit will store the data.

Figure 3:
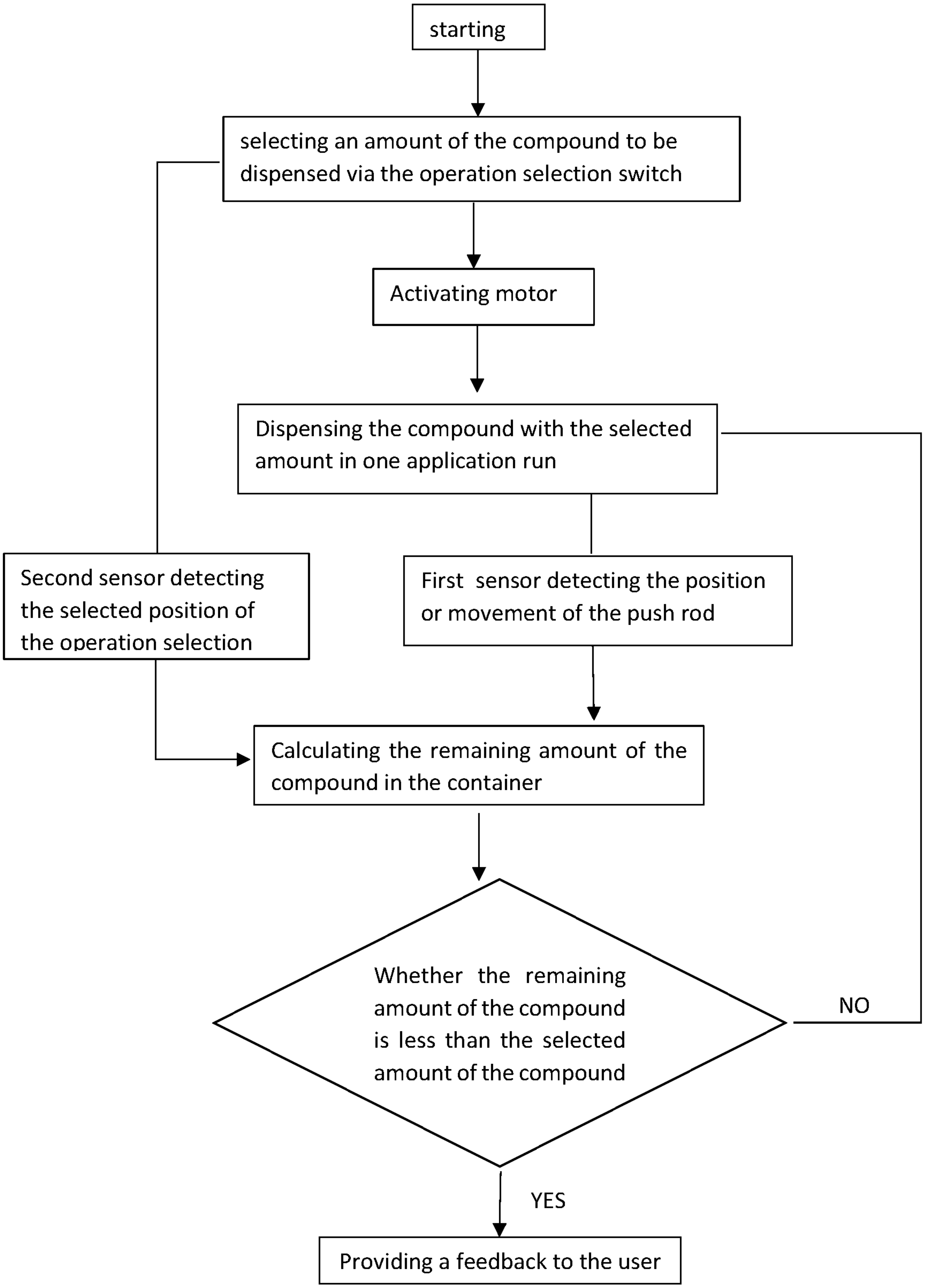
FIG. 3 illustrates the flow chart of the operating method of the dispenser of FIG. 1.

The method for operating the dispenser 11 will now be described with reference to FIGS. 2 and 3. The method of the present invention includes the following steps:

a). selecting an amount of the compound to be dispensed for one application run via an operation selection switch according to the position of the operation selection switch detected by a second sensor. According to a preferred embodiment of the invention, operation selection switch 41 includes a “serial” position, in which one application run is repeated and the selected amount of the compound to be dispensed is the same in the repetition of the application runs. Herein "application run" means one dosing process which is started by a user and terminated automatically once the preselected compound has been dispensed, e.g. when the push rod has been moved accordingly. According to the position of the operation selection switch, a selected amount of the compounds to be dispensed is determined. The second sensor 43 is linked to the operation selection switch 41 to detect the selected position thereby determining the amount of the compound to be dispensed set by the operation selection switch.

b). triggering main switch to activate the motor and a first sensor detecting the position or movement of the push rod; when the user triggers the main switch 26, the motor is activated, and the push rod will move forward to dispense the compound. The first sensor 42 detects the movements of the push rods 13 and sends signal to the control unit 31.

c). a control unit calculating the remaining amount of the compound in the container by summarizing the previous movements of the push rod and warning the user if the remaining amount is less than the selected amount of the compound.

According to one preferred embodiment of the invention, the remaining amount of the compound in the container is represented by the position of the push rod 13. As the push rod will press against the end of the container before starting the application, the remaining compound in the container will be changed accordingly along with the moving forward of the push rod. Therefore, it is easy to calculate how much amounts of the compound are left by detecting the position of the push rod.

According to one alternatively embodiment of the invention, the remaining amount in the container is calculated by summarizing the previous movements of the push rod 13. The dispensed amount of the compound is a value indicating the movements of the push rod, when the first sensor detect the movements of the push rods and send the data to the control unit, the control unit will summarize the previous movements of the push rods and possess the movements of the push rod into the amount of the compound that has been already dispensed. As the containers 6 have the different types and sizes, the first sensor 42 can also detect the starting position of the push rod, which represents the total amounts of the compound in the containers. Then the control unit will work out how much amounts of the compound are left in the containers by using the total amounts minus the already dispensed amounts of the compound.

Next, the control unit 31 will compare the value of remaining amounts detected by the first sensor and the selected amount of the compound to be dispensed which is detected by the second sensor, to determine if the remaining amount in the container/cartridge/foil pack is less than the selected amount of the compound. If the remaining amount in the container is less than the selected amount of the compound, the control unit 31 provides a feedback to the user so that the user will notice the shortage of the compound in the container and change a new one or provide additional compound or container. If the remaining amount of the compound left in the container is still more than the selected amount of the compound to be dispensed, then there is no risk of interruption in the next application run due to compound shortage, the user can continue proceeding the next application with interruption.

The user would not expect an interruption in any one of the applications runs during the serial applications because it may cause to rework of cured chemical compound. It is advantageous that if the user can notice the compound shortage between one full application run and the next one. Then the user changes a new container or provide the additional material to avoid a dissatisfied dispensing during the serial applications.

Moreover, an indicator 32 is provided which is electrically connected to control unit 31 and which generates a user-perceivable signal when the interrupted application has been completed. Indicator 32 includes a LED for generating a visible signal. Once the control unit realizes that the remaining amount of the compound is less than the selected amount of the compound, not enough for completing the next application run, then LED will light up. Alternatively, the indicator 32 generates an audible signal. With these actions, the user will notice the compound shortage so that he is able to prepare all needed material beforehand and can ensure a minimum interruption of the dispensing process.

Using the dispenser and the operating method according to the present invention an operator is able in a convenient manner to perform serial application with a minimum interruption, there-by improving the user satisfaction. While only selected embodiments have been chosen to illustrate the present invention, it will be apparent to those skilled in the art from this disclosure that various changes and modifications can be made herein without departing from the scope of the invention. Thus, the foregoing descriptions of the embodiments according to the present invention are provided for illustration only, and not for the purpose of limiting the invention.

The invention claimed is:

1. A method for operating a dispenser for a compound-containing container, the method comprising:

receiving, at a control unit comprising a processor and a memory storing instructions, an activation signal from a main switch configured to activate a motor operably coupled to at least one push rod displaceable relative to a receiving chamber configured to receive the compound-containing container;

receiving, at the control unit, input from an operation selection switch indicative of an amount of the compound to be dispensed in one application run;

receiving, at the control unit, sensor data from a first sensor configured to detect a position or movement of the at least one push rod;

calculating, with the control unit, a remaining amount of the compound in the compound-containing container based on the sensor data;

generating, with the control unit, a signal if the remaining amount of the compound in the compound-containing container is less than the selected amount of the compound to be dispensed; and reflecting the signal with an indicator to warn a user prior to initiating a dispensing operation if the remaining amount is insufficient, wherein the dispenser comprises a second sensor configured to detect the selected amount of the compound based on a position of the operation selection switch.

2. The method according to claim 1, wherein the operation selection switch comprises a serial position in which the one application run is repeated and the selected amount of the compound to be dispensed is the same in each repetition of the one application run.

3. The method according to claim 1, wherein calculating the remaining amount of the compound in the compound-containing container comprises determining the position or movement of the at least one push rod.

4. The method according to claim 1, wherein calculating the remaining amount of the compound in the compound-containing container comprises summarizing previous movements of the at least one push rod.

5. The method according to claim 1, wherein the indicator comprises a visual or audible signal generator.

6. A dispenser for a compound-containing container, comprising:

a receiving chamber configured to receive the compound-containing container;

at least one push rod displaceable relative to the receiving chamber;

a motor operably coupled to the at least one push rod and configured to move the at least one push rod to dispense a compound from the compound-containing container;

a main switch configured to activate the motor;

an operation selection switch configured to allow a user to select an amount of the compound to be dispensed in one application run;

a first sensor configured to detect a position or movement of the at least one push rod;

a control unit comprising a processor and a memory storing instructions, the control unit being electrically coupled to the main switch, the operation selection switch, and the first sensor, and configured to:

receive an activation signal from the main switch, receive input from the operation selection switch indicative of the selected amount of the compound, receive sensor data from the first sensor indicative of the position or movement of the at least one push rod, calculate a remaining amount of the compound in the compound-containing container based on the sensor data, and generate a signal if the remaining amount of the compound in the compound-containing container is less than the selected amount of the compound to be dispensed;

an indicator configured to reflect the signal from the control unit, thereby warning the user prior to initiating a dispensing operation if the remaining amount is insufficient; and a second sensor configured to detect the selected amount of the compound set by the operation selection switch according to a selected position of the operation selection switch.

7. The dispenser according to claim 6, wherein the operation selection switch comprises a serial position in which the one application run is repeated and the selected amount of the compound to be dispensed is the same in a repetition of the one application run.

8. The dispenser according to claim 6, wherein the indicator comprises a visual or audible signal generator.

9. The dispenser according to claim 6, wherein the remaining amount of the compound in the compound-containing container is calculated by determining the position or movement of the at least one push rod.

10. The dispenser according to claim 6, wherein the remaining amount of the compound in the compound-containing container is calculated by summarizing previous movements of the at least one push rod.

* * * * *